United States Patent
Valentine et al.

(10) Patent No.: US 6,510,171 B1
(45) Date of Patent: Jan. 21, 2003

(54) MULTI-LINK WIRE HOPPING OVER COPPER PAIRS

(75) Inventors: Eric Valentine, Plano, TX (US); Walter Lee Davidson, McKinney, TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/336,417

(22) Filed: Jun. 17, 1999

(51) Int. Cl.⁷ ............................................. H04B 1/69
(52) U.S. Cl. ........................................................ 375/130
(58) Field of Search ................................. 375/130, 147, 375/149, 257, 222

(56) References Cited

U.S. PATENT DOCUMENTS 4,740,955 A * 4/1988 Litterer et al. ............... 370/264
5,729,548 A * 3/1998 Holender ..................... 359/139
6,304,596 B1 * 10/2001 Yamano et al. .............. 370/389
6,359,881 B1 * 3/2002 Gerszberg et al. ........... 370/354

\* cited by examiner

*Primary Examiner*—Chi Pham
*Assistant Examiner*—Khai Tran
(74) *Attorney, Agent, or Firm*—Jenkens & Gilchrist, P.C.

(57) ABSTRACT

A system and method for transmitting a signal from a telephone terminal to a central office. The telephone terminal and central office are connected to aggregation points. The aggregation points include wire hoppers which receive the signals from the telephone terminal and the central office, spread the signals over a plurality of communication channels and transmit the signals over a common multilink transmission medium. When the signals are received at the central office, they are accordingly reassembled.

18 Claims, 3 Drawing Sheets

MULTI-LINK WIRE HOPPING OVER COPPER PAIRS

BACKGROUND OF THE INVENTION

1. Technical Field of the Invention

The present invention relates to multiple access communications and, in particular, to the transmission of code division multiple access modulated signals over bundled copper wire pairs in a public switched telephone network.

2. Description of Related Art

During the initial introduction of telecommunications exchanges, all telecommunications subscribers were connected with their servicing telecommunications exchange via a copper wire pair, also referred to herein simply as 'pair', which formed an individual physical path to the servicing telecommunications exchange. For each physical path, a trench had to be dug in which to lay the copper wire pair. However, due to the rapid increases in the numbers of telecommunications subscribers, the number of physical paths required quickly became numerous and unmanageable.

The foregoing problem was alleviated by bundling individual copper wire pairs into a single physical path to the servicing telecommunications exchange. Individual copper wire pairs would lead from a termination point at the subscriber's premises to a nearby aggregation point. At the aggregation point, many copper wire pairs serving nearby subscribers are bundled together and laid in a single physical path. Additionally, several bundles may intersect at another aggregation point and be further bundled together and laid in a single physical path to a serving telecommunications exchange.

Degradation in the quality and clarity of the transmitted signal to the subscriber can occur due to either variable and changing transmission qualities of the copper wire pair or cross-talk. Cross-talk occurs when a signal transmitted on one copper wire pair creates an electromagnetic field which induces a current in a different copper wire pair which interferes with the signal transmitted on the different copper wire pair. Cross-talk is effected by three factors—distance between the copper wire pairs, insulation of the copper wire pairs, and the power of the transmitted signal. Bundling the copper wire pairs inherently increases the likelihood of cross-talk. Although copper wires are well insulated, cross-talk still occurs when the transmission power of a signal is high. Accordingly, the transmission power must be limited to prevent cross-talk. Limiting the transmission power, however, reduces the bit transmission rate of a digital signal.

Additionally, degradation in the transmission quality can occur as a result of changes or deterioration in the transmission properties of the copper wire pair. The problem due to failure of the copper wire pair are usually solved by switching the affected subscriber to an unused copper wire pair or, where no unused copper wire pair exists, laying a new copper wire pair. Identifying, swapping, and laying copper wire pairs is an expensive operation.

Furthermore, traditional transmissions over individual pairs are capacity inefficient in the sense that when the subscriber unit is idle, the pair is likewise idle and, in such a state, represents an untapped bandwidth potential between the idle subscriber and the central office. In other words, the local loop between a subscriber and a central office has conventionally been implemented as a dedicated circuit. When the user is not making communications over the respective copper wire pair, that pair is idle and the pair capacity is simply wasted. A multilink transmission engaging all available pairs in a multiplexing scheme could utilize the intrinsic capacity of each pair thus providing greater bandwidth to the active subscribers at a given moment by exploiting the transmission capacity of the otherwise idle pairs.

Accordingly, it is a first object of the present invention to maintain an acceptable level of transmission quality while minimizing the need to identify, swap and lay new copper wire pairs due to failure or degradation of individual copper wire pairs.

It is another object of the present invention to more efficiently exploit the intrinsic capacity of existing wire pairs in a pubic switched telephone network.

It is yet another object of the present invention to employ bundled copper wire pairs as a multilink transmission medium in a public switched telephone network.

It is still another object of the present invention to provide code division multiple access modulation over bundled copper wire pairs in a public switched telephone network.

It is still another object of the present invention to provide greater bandwidth to individual subscribers of a public switched telephone network for digital communications without increasing the number of copper wire pairs employed for such communications.

It is still another object of the present invention to allow failure of an individual or plurality of copper wire pairs in a bundled set of copper wire pairs without interruption or failure of services to any individual subscribers.

These and other objects are addressed by the merits of the present invention as described in the forthcoming detailed description and accompanying figures contained hereinbelow.

SUMMARY OF THE INVENTION

The present invention is directed to a system and method for transmitting a signal from a telephone terminal to a central office. The telephone terminal and central office are connected to aggregation points. The aggregation points include wire hoppers which receive the signals from the telephone terminal and the central office, spread the signals over a plurality of communication channels and transmit the signals over a common multilink transmission medium. When the signals are received at the central office, they are, accordingly, reassembled.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF PRESENTLY PREFERRED EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
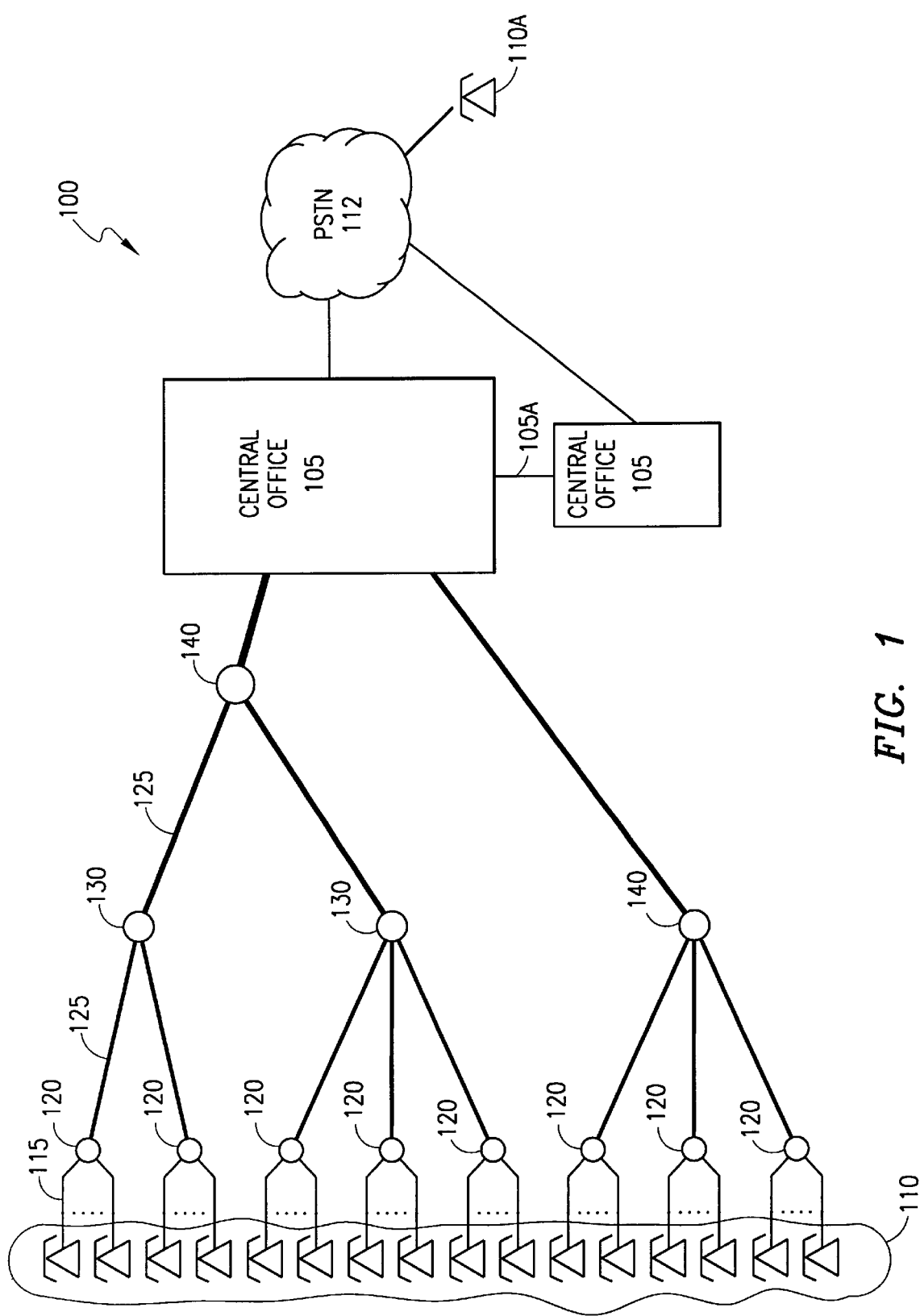
FIG. 1 is a block diagram of an exemplary telephone network embodying the present invention.

Referring now to FIG. 1, a block diagram of an exemplary telecommunications network 100 embodying the present invention is illustrated. The telephone network comprises a central office (CO) 105 serving a plurality of subscriber terminals 110. The central office 105 may be connected to and form a portion of a public switched telephone network (PSTN), as shown in the figure. Each of the subscriber terminals 110 served by the central office 105 is connected to the central office via a copper wire pair, generally designated by the reference numeral 115. The copper wire pair 115 is the communications medium on which communications are transmitted between the served subscriber terminal 110 and the central office 105. As aforementioned, in the prior art systems each individual copper wire pair providing service to a respective subscriber is employed as a dedicated circuit, i.e., it is provided solely for the use of the subscriber who terminates the specified pair. Thus, failure of a copper wire pair at any point in the local loop will result in failure of service to the associated subscriber.

The subscriber terminals 110 served by the central office 105 are usually located several miles from the central office and sparsely spread out over a geographic area of several square miles. Therefore, the connecting copper wire pairs 115 must be laid across the land between the subscriber terminals 110 and the central office 105. To protect the copper wire pairs 115 from the external elements, a physical path (not shown), such as a trench or a series of telephone poles, is used.

As the number of subscriber terminals 110 is increased, it is unfeasible to establish a separate physical path for each subscriber terminal 110. Instead, individual copper wire pairs are bundled and use a common physical path to the serving central office 105. In this case, individual copper wire pairs 115 lead from a termination point at the subscriber's premises to a nearby subscriber side aggregation point 120. At the subscriber side aggregation point 120, many copper wire pairs 115 serving nearby subscriber terminals 110 are laid together in a common physical path forming a bundle 125. Additionally, several bundles 125 may intersect at an intermediate aggregation point 130 and central office side aggregation point 140 and be further bundled together and laid in a common physical path to a serving central office, such as the central office 105 shown in FIG. 1.

Degradation in the quality of signal transmission can occur as a result of changes or deterioration in the transmission properties of the copper wire pair 115. Problems due to deterioration of the copper wire pair 115 are usually solved by switching the affected subscriber to an unused copper wire pair or, where no unused copper wire pair exists, laying a new copper wire pair. Identifying, swapping, and laying copper wire pairs, however, is an expensive operation. In order to minimize the foregoing, the present invention proposes multi-link wire hopping at the aggregation points 120, 130 and 140.

Figure 2:
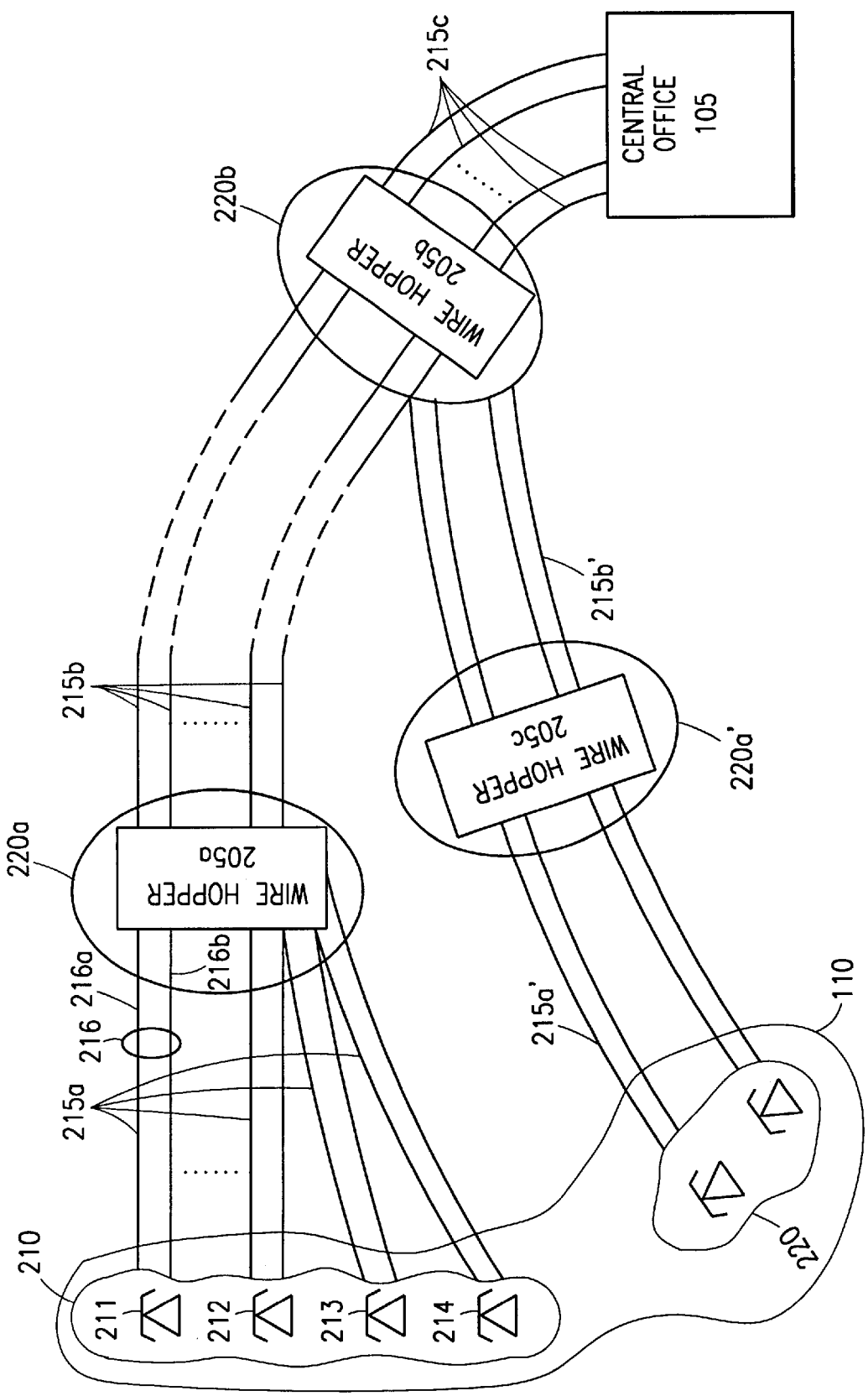
FIG. 2 is a block diagram of a network of aggregation points in accordance with the present invention.

Referring now to FIG. 2, a block diagram of a network of aggregation points 220a, 220a' and 220b are illustrated. The aggregation point 220a, which receives incoming copper wire pairs 215a directly from the respective subscriber terminals 210 and the central office side aggregation point 220b, which itself directly receives a bundle from a central office 205, includes a wire hopper 205a. Likewise, aggregation point 220b includes a wire hopper 205b. Wire hoppers, e.g., 205a, serve as a junction point for incoming copper wire pairs 215a that occupy physically remote areas and the bundled pairs 215b and 215b' that occupy the same physical path. Wire hoppers also serve as a junction point for the conjoining of multiple bundled pairs, e.g., wire hopper 205b conjoins bundled pairs 215b and 215b'. Subscriber side aggregation point 220a is referred to herein as such since it is the first aggregation point from which the copper wire pairs 215a pass through when traversing a path from the subscriber terminals 210 to the CO 205. Similarly, the aggregation points located most closely to CO 105 are referred to as central office side aggregation points, e.g., central office side aggregation point 220b.

It should be understood that any number of intermediate aggregation points may be included, such as the aforementioned intermediate aggregation points 130 in FIG. 1. Furthermore, it is not necessary to have both subscriber side aggregation points and central office side aggregation points to realize the benefits of the present invention. Only a single aggregation point is necessary for a proper embodiment of the invention, as will be described more fully hereinbelow.

The wire hopper 205a at subscriber side aggregation point 220a divides the plurality of incoming copper wire pairs 215a in two regional halves—a subscriber side half comprised of individual, physically disparate wire pairs, and, a bundled copper wire pairs half, corresponding to the aforementioned bundled pairs 215b. The incoming copper wire pairs 215a lead from the subscriber side aggregation point 220a to the individual, physically remote subscriber terminals 210. Clearly, the portions of the copper wire pairs 215a located on the subscriber side will occupy physically remote geographical regions since they are terminated at distinct subscriber terminals 210.

With reference again to FIG. 2, signals transmitted from any of the subscriber terminals 210 towards the central office 205 are received by the wire hopper 205a on the incoming copper wire pairs 215a. The signals received from the incoming copper wire pairs 215a are forwarded by the aggregation point or node 220a to the central office 205 by transmitting the signals on the bundled pairs 215b. However, to minimize the impact and maintenance associated with a particular copper wire pair of the bundled wire pairs 215b deteriorating and for greater utilization of the copper wire pairs transmission capacity, the wire hopper 205a receives signals transmitted individually over single copper wire pairs of the incoming copper wire pairs 215a and subsequently relays these signals towards CO 205 over the plurality of bundled pairs comprising the bundled pairs 215b, i.e., a signal received by wire hopper 205a from a single pair of the incoming copper wire pairs 215a is physically received at wire hopper 205a on a single wire of one copper wire pair but is transmitted to wire hopper 205b across multiple ones of the bundled pairs 215b in multilink fashion. Thus, failure of one of the bundled pairs at a point between wire hoppers 205a and 205b will not result in failure of service to a subscriber traditionally associated with that pair since the signal is being transmitted across several or multiple ones of the available, operating bundled pairs 215b.

It is important to note that in this inventive transmission, a subscriber is not strictly associated with a single pair of the bundled pairs 215b as in traditional local loop transmissions. Instead, the physical association of a subscriber terminal 210 and with a single pair ends at the local wire hopper 205a. At wire hopper 205a, any received signal from a pair of the incoming copper wire pairs 215a is parsed and transmission to the next aggregation point, e.g., 220b, is completed across bundled pairs 215b i.e., in spread spectrum fashion. Utilization of the bundled pairs 215b in such a multilink fashion is inherently accommodating for multiple access transmissions inasmuch as the bandwidth capacity of a fully functional bundle of bundled pairs 215b provides for, at a minimum, the equivalent bandwidth per subscriber that is provided when the bundled pairs 215b are allocated in a dedicated manner as in traditional local loop communications.

In a preferred embodiment of the present invention, the spread spectrum mode of transmission is code division multiple access (CDMA), and thus concurrent transmissions from multiple subscribers are provided with a reduction in mutual interference by the orthogonality of the CDMA modulation codes, as is well known to those skilled in the art.

When the transmitted signal is received at the central office side aggregation point 220b, the signal is respread by the wire hopper 205b by distinguishing the individual carriers according to their respective modulation codes. Thus, wire hopper 205b similarly allows for spreading of the signals received at aggregation point 220b for transmission over the bundled pairs 215c. The spreading and transmission of received signals at aggregation point 220b is generally characterized as occurring over a greater bandwidth with respect to that which occurs at subscriber side aggregation points 220a and 220a' by respective wire hoppers 205a and 205c since bundled pairs on the CO 205 side of any aggregation point are predominantly bundled in greater plurality than bundled pairs on the terminating side of the same aggregation point. Therefore, respreading and transmitting of signals received at a subsequent aggregation point, each subsequent aggregation point closer approaching CO 205 with respect to a prior aggregation point, is necessary to fully utilize the additional wire pairs encountered at each aggregation point when traversing a path from a terminating end of a bundle to the CO 205 end. The bundled pairs 215c are the bundled portions of the copper wire pairs which lead from the central office side aggregation point 220b to the central office 205.

As discussed, wire hopper 205b respreads the signals received from wire hopper 205a and any other wire hoppers, e.g., bundled pairs 205c, having bundled pairs aggregated at the central office side aggregation point 220b. The respread signals are transmitted towards CO 205 across bundled pairs 215c pairs comprised of, in the illustrative example, the aggregation of bundled pairs 215b and 215b'. When signals transmitted across bundled pairs 215c are received at the CO 205, the individual signals are recovered by despreading them according to their respective modulation codes.

Clearly, a single signal transmitted from a single subscriber terminal 210 and traversing a plurality of aggregation points will be spread with multiple modulation codes, as is the case in the current example. At each aggregation point where the number of bundled pairs available on the CO 205 side is greater than the number of pairs over which the signal was transmitted to the aggregation point, the signals will be remodulated, i.e., respread with a new CDMA modulation code, in order to efficiently utilize the increased available transmission links had by traversing the aggregation point.

For example, a signal transmitted from any one of the subscriber terminals 210 towards the CO 205 will first be transmitted from the respective subscriber terminal, e.g. subscriber terminal 211, to subscriber side aggregation point 220a over a single wire, e.g., wire 216a, of a corresponding single wire pair, e.g., wire pair 216.

As aforementioned, the wire pairs comprising the incoming copper wire pairs 215a are physically associated with respective subscriber terminals. However, once a signal reaches subscriber side aggregation point 220a, the physical association ceases. At this point, all of the bundled pairs comprising bundled pairs 215b are available as a multilink transmission medium for a signal received at subscriber side aggregation point 220a. Moreover, each and every bundled pair comprising bundled pairs 215b and 215b' and bundled pairs 215c are preferably used for transmitting individual carriers of a transmission from a single subscriber terminal transmission. The benefit of using the entire multilink transmission channels in conjunction with CDMA modulation lies in the fact that the greater spectrum over which the signal is spread, the lower the individual transmission power becomes for obtaining an acceptable signal-to-noise ratio.

It should also be noted that each wire of the individual wire pairs comprising the bundled pairs 215b are available for bidirectional communications, i.e., individual data bits can be sent in either direction over a single wire included in the bundled pairs 215b. This is also, of course, true for the bundled pairs 215c and any intermediate bundled pairs. The only portion of the transmission medium where the individual wires of the wire pairs are dedicated for unidirectional communications are the pairs comprising the incoming copper wire pairs 215a where one wire of a wire pair is for transmission from a subscriber side aggregation point to a subscriber terminal and the other wire of the respective wire pair is for transmissions from the respective subscriber terminal to the subscriber side aggregation point.

It should be understood that the number of aggregation points between a set of subscriber terminals and a central office and the corresponding number of signal spreading and assembly operations is inconsequential with respect to the nature of the present invention. The current example comprising three aggregation points is for illustrative purposes only. In fact, the present invention requires only one such aggregation point. Any number of additional aggregation points may be accommodated as necessitated by the actual transmission or physical requirements in a manner consistent with that as described in the ongoing representative description. It should also be understood that the number of bundled pairs aggregated at an aggregation point is inconsequential.

Signals transmitted from the central office 205 towards the subscriber terminal 110 are received by the wire hopper 205b on the bundled pairs 215c. The signals received from the bundled pairs 215c are forwarded towards the subscriber terminals 210 by transmitting the signals on the bundled pairs 215b. The wire hopper 205b, upon reception of signals transmitted from CO 205 must make an evaluation of which bundled pair the signal is destined for.

In the current example, signals received from CO 205 at aggregation point 220b by wire hopper 205b can be destined for any of the plurality of subscribers in either of the sets of subscriber terminals 210 or 220. An evaluation of the destination of a received signal at wire hopper 205b can easily be made by reference to encoding address information within the original spread signal. Destination information may equivalently be determined by the distinct CDMA modulation code used in the original transmission from the CO 205.

In any event, signals that are spread and transmitted across the bundled pairs 215c are recovered by wire hopper 205b where they are evaluated for termination destinations, respread and transmitted over the appropriate bundled pairs 215b or 215b'. This process is similarly repeated at each aggregation point traversed in the transmission path until the final subscriber-side aggregation point is encountered, at which point the signals are despread according to their associated modulation code and forwarded to the appropriate subscriber.

Thus, in the present example of a transmission from CO 205 to any subscriber terminal in either of the sets of subscriber terminals 210 and 220, a given transmission would be subject to two distinct CDMA modulations: the first CDMA modulation occurring at CO 205 in order to transmit a signal from the CO 205 to central office side aggregation point 220b and a second CDMA modulation occurring at central office side aggregation point 220b in order to transmit the signal to either of subscriber side aggregation points 220a or 220a'. Two CDMA modulations would likewise be required to transmit a signal in the reverse path, i.e., from a subscriber terminal towards CO 205. These modulations would occur at either of subscriber side aggregation points 220a or 220a' and a second CDMA modulation occurring at central office side aggregation point 220b. In general, the number of modulation procedures performed on a given signal required to transmit the signal from one of the subscriber terminals 110 to the central office 205 is equal to the number of aggregation points over which the signal traverses.

It should be noted that as the signal traverses an aggregation point in a direction towards CO 205, the available spectrum over which the signal may be modulated is increased due to additional number of pairs comprising the bundled pair when traversing an aggregation point. Naturally, when transmitting in the opposite direction, the available spectrum decreases when crossing an aggregation point since a portion of the available pairs will be bundled in a physically separate bundle.

The foregoing spreads the degradation in signal quality that would be experienced at one subscriber terminal to each of the subscriber terminals 210 in the event a particular copper wire pair has deteriorated or failed. If the deteriorated copper wire pair is used by one of the subscriber terminals 210 in a dedicated manner, even a small amount of deterioration of the copper wire pair could result in a major degradation of the transmitted signal quality. However, by transmitting a given signal over the plurality of bundled wire pairs 215b, the degradation of the signal received by each of the subscriber terminals is likely to be imperceptible where the number of subscriber terminals 210 is large. Therefore, identifying, swapping, or laying a new copper wire pair can be avoided. Furthermore, the wire hoppers can be configured to deallocate a faulty or inoperative wire pair as a transmission medium as described more fully hereinbelow with reference to FIG. 3.

The foregoing also allows a telecommunications network, such as network 100 in FIG. 1, to provide higher speed digital services to subscribers at subscriber terminals 110. One of the major limiting factors in providing high speed digital services is the phenomena of cross-talk. Cross-talk occurs when a signal transmitted on one copper wire pair creates an electromagnetic field which induces a current in an adjacent, different copper wire pair, which interferes with the signal transmitted on the different copper wire pair. Cross-talk is affected by three factors—distance between the copper wire pair, insulation of the copper wire pairs, and the power of the transmitted signal. Bundling the copper wire pairs inherently increases the likelihood of cross-talk.

Although copper wire pairs may be well insulated, cross-talk may occur when the transmission power of a signal is high. Accordingly, limiting the transmission power prevents cross-talk.

Limiting the transmission power, however, reduces the bit transmission rate of a digital signal. The bit transmission rate of a digital signal is limited by the acceptable signal to noise ratio, which is the minimum allowable ratio of the power of the transmitted symbol or bit divided by the power of the noise in order for a communication system to function properly. In order to increase the signal to noise ratio, either the transmission power must be raised, or the noise must be reduced.

Although the level of noise on different copper wire pairs varies, when determining the transmission power for digital services the noise on the copper wire pair is normally estimated using a worst-case scenario to ensure reliable communications. However, by using the bundled pairs as a multilink transmission medium and assuming all pairs comprising the bundled pairs are operative, the user is assured that under the worst-case scenario, i.e., all subscriber terminals sharing the associated bundled pair are actively engaged in communications across the bundled pair, at a minimum an equivalent amount of bandwidth will be available per user that would otherwise be available if each of the pairs comprising the bundled pairs were individually allocated to respective individual subscribers.

Since it is highly unlikely that all subscribers in a given set of subscriber terminals 110 will concurrently be engaged in communications, the available bandwidth will normally, i.e., when less than all subscribers are making transmissions over the shared multilink transmission medium, be greater over the multilink portion of the transmission medium with respect to the bandwidth available to a subscriber when the pairs are allocated in a dedicated manner.

Consequently, under normal conditions, failure of a limited number of pairs in any of the bundled portions of pairs will not lower the available bandwidth for an active subscriber below that which the subscriber would obtain operating on a dedicated pair. Nor would failure of a pair in any bundled portion of the transmission medium cause any subscriber to lose service as a result of the failure, a distinct advantage over prior art, dedicated local loop communication systems.

Moreover, the choice of CDMA as a preferred modulation scheme addresses the issues of signal to noise ratios and limiting transmission power, thus alleviating the principle concerns of cross talk. By transmitting the signals over a plurality of pairs according to CDMA modulation techniques, mutual interference occurring between the closely bundled pairs is reduced as a function of the orthogonality of the unique codes used for each transmission. The well known Walsh codes are an exemplary set of these unique codes and their acceptance within the communications community provides testament to their efficacious. Also well established is the degree of energy dispersion achieved by CDMA modulation with respect to other digital transmission schemes, e.g., time division multiple access (TDMA).

Figure 3:
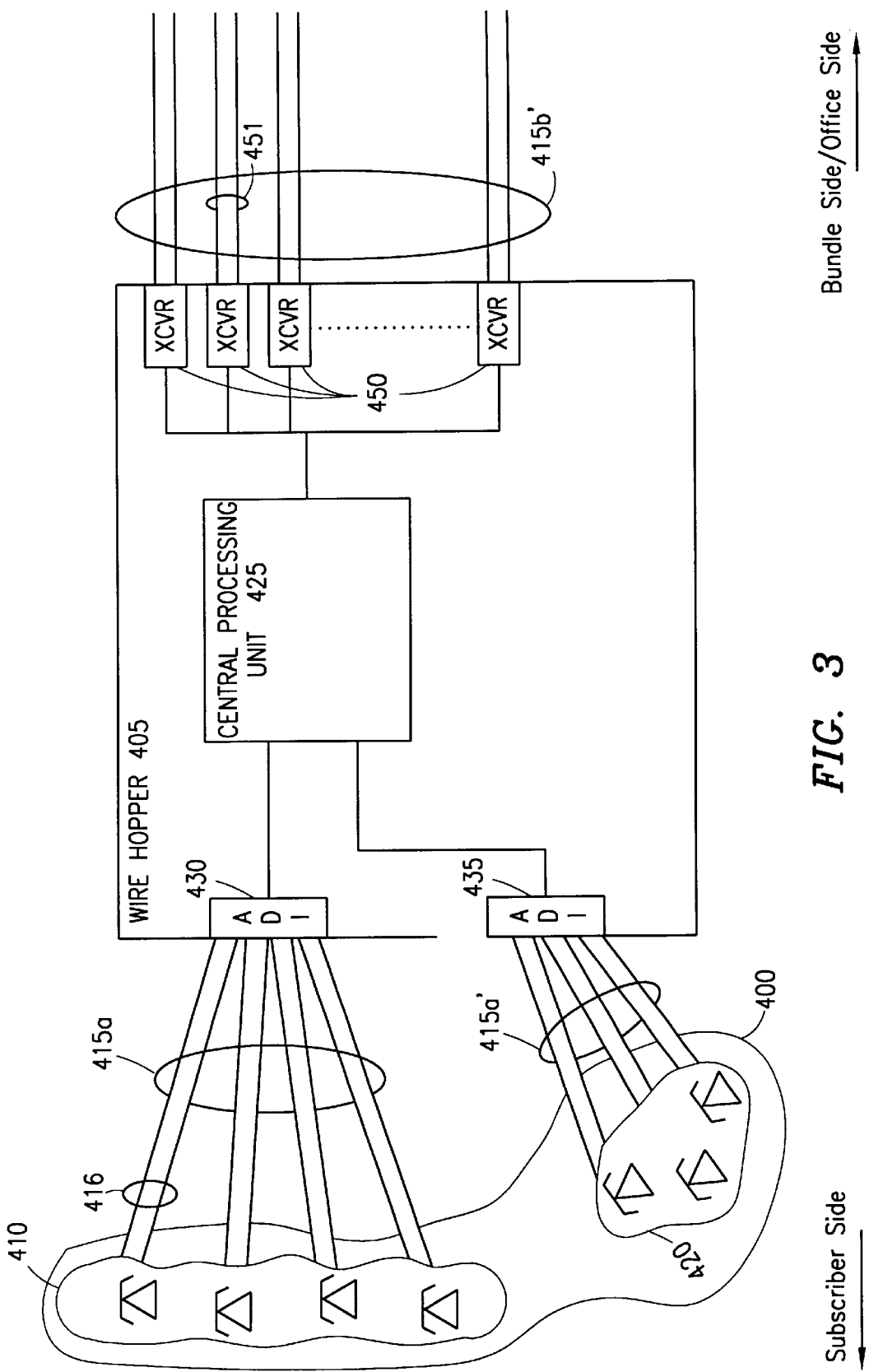
FIG. 3 is a block diagram of a wire hopper in accordance with the present invention.

Referring now to FIG. 3, a diagram of an individual wire hopper 405 is illustrated. The wire hopper 405 allows conjoinment of a number of incoming copper wire pairs 415a and 415a' at a common point in telecommunications network 100. Since the instant invention is advantageously deployable on current public switched telephone network infrastructures, the number of pairs comprising a central office half 415*b* is preferably equivalent to the sum of the pairs comprising all of the incoming copper wire pairs 415*a* and 415*a'* converging at wire hopper 405.

Although the present illustrative example illustrates and describes a wire hopper 405 as configured at a subscriber side aggregation point 220*b*, it should be evident that the essential operation of a wire hopper at any aggregation point principles of the present invention are equally applicable at other aggregation nodes whether subscriber or central office side. It should be understood that the primary difference between wire hoppers, such as wire hopper 405, at subscriber side aggregation points and those at central office side and any intermediate aggregation points is the presence of analog/digital interfaces (ADIs) 430 and 435 in wire hoppers at subscriber side aggregation points.

With reference again to FIG. 3, wire hopper 405 receives analog signals over incoming copper wire pairs 415*a* and 415*a'* from subscriber terminals respectively located within sets of subscriber terminals 410 and 420, each of the incoming copper wire pairs respectively interfaced at wire hopper 405 with the ADIs 430 and 435. It should be understood that the ADIs 430 and 435 serve to condition the analog signals received from subscriber terminals, generally designated by the reference numeral 400, by converting the analog signals into digital signals appropriate for transmission spreading across the multilink channeled bundled pairs 415*b*.

Likewise, ADIs 430 and 435 also convert digital signals into analog signals transmitted from CO 105 towards a particular terminal of the group of subscriber terminals 400. Wire hopper 405 may also receive digital signals from incoming copper wire bundled pairs 415*b* pairs. Each individual signal received over incoming copper wire pairs 415*a* or 415*a'* is preferably received in its entirety over a single pair, e.g., pair 416, of incoming copper wire pairs 415*a*. Nonetheless, multiple signals will generally be received concurrently by wire hopper 405 over incoming copper wire pairs 415*a* and 415*a'* up to and including the concurrent reception of a signal over every pair comprising both incoming copper wire pairs 415*a* and 415*a'*.

When receiving an analog signal or a plurality of analog signals over incoming copper wire pairs 415*a* and 415*a'*, the signals are first digitized by respective ADIs 430 and 435. The digitized signals are then forwarded to a central processing unit 425 for conditioning these signals for CDMA modulation over the copper pair bundle comprising the bundled pairs 415*b*. This primarily consists of encoding each received signal with a CDMA modulation code, e.g., Walsh code, and streaming the signal to the appropriate CDMA transceivers 450, each of which are interfaced to a single respective pair of the plurality of pairs comprising the bundled pairs 415*b*.

In a preferred embodiment, the CDMA transceivers are wideband CDMA transceivers. The specific pair on which a given signal is transmitted over at any given instance is dictated by the modulation code assigned to that signal. In general, transmission of each of the received signals will occur across all available channels, i.e., they will be spread across the entire capacity of the bundled pairs 415*b*.

A particular advantage in the implementation of the present invention is that the CPU 425 controls the activation and deactivation of individual channels available on the pairs comprising bundled pairs 415*b*. Thus, if it is determined that an individual pair is faulty or inoperative, e.g., wire pair 451, that pair can be deallocated so that no transmissions are made across it and without interrupting the availability of any other available pairs. Deallocation of a faulty pair may be made remotely from an operations and maintenance center in communication with the CPU 425 or locally by internal testing and control algorithms contained and operated within wire hopper 405. Furthermore, the preferred modulation of the present invention is further enhanced by the allowance of bidirectional communications over both wires of each wire pair comprising bundled pairs 415*b*. CPU 410 may be configured to dynamically alter the communication direction over individual pairs of bundled pairs 415*b*, thereby allowing for greater reduction in the mutual interference occurring between the bundled individual pairs.

Therefore, failure of a pair at a point in any bundled portion of the copper wire pairs will not result in failure of service to any subscriber utilizing the bundled pairs as a transmission medium. This allows the operator of telecommunications network 100 to delay replacement or repair of the defective pair until the number of defective pairs in a given bundle lowers the aggregate bandwidth of the bundled pairs below a specific threshold, thereby minimizing operation costs.

Similarly, if a defective pair is not deallocated from the multilink transmission medium, the resulting deterioration in transmission quality will be effectively spread among the numerous subscriber terminals 400 communicating over the associated bundled pairs 415*b*. Failure of a single pair in a large bundle will generally result in imperceptible degradation of signal quality to the individual subscriber. Hence, repair or replacement of the defective pairs may be delayed until the number of defective pairs lowers the transmission quality of the respective bundle below an acceptable threshold.

A particular advantage is allowed by the present invention when a subscriber is making or receiving digital communications, e.g., Internet communications, across the incoming copper wire pairs 415*b*. In the prior art local loop communication systems, a subscriber is limited to the relatively low bandwidth of the dedicated, voice grade copper wire pair assigned to the respective subscriber. However, in the present invention, a particular subscriber terminal will have access and command of a much greater transmission capacity as obtained by utilizing all the copper wire pairs in bundled sections of the transmission paths as individual channels of a multilink transmission medium. Although the available capacity will vary as the number of active subscriber terminals fluctuates, the amount of spectral capacity available per active subscriber terminal will, in general, easily exceed that of the prior art systems.

With reference also to FIG. 1, since the individual subscriber terminals included in the set of subscriber terminals 400 will have greater bandwidth available over the bundled portions of the transmission link between the subscriber terminals 400 and the central office 105, the dedicated portion of the path, i.e., the individual copper wire pairs 115 linking the subscriber terminals to the subscriber side aggregation point 120, will generally limit the maximum transmission rates obtainable by any of the given subscriber terminals 400. Hence, the present invention may be modified to provide greater overall system efficiency by replacing the dedicated copper wire pairs 115 with higher capacity links. Alternatively, a subscriber terminal may be equipped with multiple copper wire pairs for parallel communications over the dedicated link between the subscriber terminal and the wire hopper 405 at subscriber side aggregation point 120.

Although the present invention has been described in conjunction with signals transmitted from subscriber terminals to a central office, and vice versa, and the treatment of the signals therebetween, it should be understood that signals transmitted from a subscriber terminal to a central office are ordinarily destined for another subscriber terminal, e.g., a subscriber terminal 110A. The destination subscriber terminal may be serviced by the same central office servicing the originating subscriber terminal or by any other central office having appropriate communication channels with the central office servicing the originating subscriber terminal. It should be apparent that any signal transmitted from a subscriber terminal to a destination subscriber terminal via any number of central offices via the respective trunks therebetween, designated generally by the reference numeral 105A. Furthermore, treatment of the transmitted signals between a central office servicing an originating or designation subscriber terminal and any intermediate central offices may be made according to the prior art or in a manner substantially similar to the improved methods as described hereinabove, i.e., the system, method and apparatus as described is not limited to only signal transmissions between a subscriber terminal and a central office but may instead be employed as a transmission scheme between two or more central offices.

It should, of course, also be understood that by use of the improvements set forth in the present invention, bandwidths are preferably increased, i.e., the analog format between subscriber terminal 110 and first aggregation node 120 is a dedicated line whereas the internodal links between the nodes 120, 130 and 140 and central offices 105, employing spread spectrum technology, has the capacity for substantially more bandwidth.

It should also be understood that the internodal spread spectrum format signals may vary bandwidth, e.g., as the number of bundled wire pairs increases.

The previous description is of preferred embodiments for implementing the invention, and the scope of the invention should not necessarily be limited by this description. The scope of the present invention is instead defined by the following claims.

What is claimed is:

1. A telecommunications system for transmitting a signal, said system comprising:
    a terminal for transmitting said signal;
    a first aggregation node connected to said terminal, said signal being received at said first aggregation node in a first format;
    a central office connected to said first aggregation node by a plurality of lines, said signal being converted at said first aggregation node from said first format into a spread spectrum format, and spread spectrum format signal being spread across said plurality of lines to said central office;
    a destination aggregation node connected to receive said spread spectrum format signal and despread said spread spectrum format signal into said signal; and
    a destination terminal connected to said destination aggregation node to receive said signal.

2. The telecommunications system according to claim 1, further comprising:
    a second aggregation node disposed between said first aggregation node and said central office, said first and second aggregation nodes being connected by a first plurality of lines and said second aggregation node and said central office being connected by a second plurality of lines, wherein said signal is converted at said first aggregation node from said first format into a first spread spectrum format and at said second aggregation node from said first spread spectrum format into a second spread spectrum format.

3. The telecommunications system according to claim 2, wherein said second aggregation node is connected to a plurality of first aggregation nodes.

4. The telecommunications system according to claim 2, wherein said second spread spectrum format has a greater bandwidth respective to said first spread spectrum format.

5. The telecommunications system according to claim 1, wherein said first aggregation node is connected to a plurality of terminals.

6. The telecommunications system according to claim 5, wherein each of said plurality of terminals are connected to said first aggregation node by at least one respective copper wire pair.

7. The telecommunications system according to claim 5, wherein at least one of said plurality of terminals is connected to said first aggregation node by a high speed digital transmission line.

8. The telecommunications system according to claim 1, further comprising:
    another central office connected to said central office by a plurality of lines, said signal being spread across said plurality of lines interconnecting said central office and said another central office.

9. The telecommunications system according to claim 1, wherein the connection between said terminal and said first aggregation node comprises a single wire pair.

10. The telecommunications system according to claim 9, wherein said wire pair comprises a copper wire pair.

11. The telecommunications system according to claim 1, wherein said plurality of lines connecting said first aggregation point and said central office comprise respective wire pairs.

12. The telecommunications system according to claim 11, wherein said respective wire pairs are bundled.

13. The telecommunications system according to claim 12, wherein said respective wire pairs transmit dynamically alterable bidirectional digital signals.

14. The telecommunications system according to claim 1, wherein said spread spectrum format is code division multiple access.

15. A method for transmitting a signal from a terminal to a central office, said method comprising the steps of:
    receiving said signal at a first aggregation node between said terminal and said central office, said signal being in a first format;
    converting, by said first aggregation node, said signal from said first format to a spread spectrum format;
    transmitting, by said first aggregation node, said signal in said spread spectrum format to said central office, said spread spectrum format signal being spread across a plurality of lines connecting said first aggregation node and said central office;
    despreading said spread spectrum signal into said signal at a destination aggregation node; and
    transmitting said signal from said destination aggregation node to a destination terminal.

16. The method according to claim 15, wherein said first format is an analog format.

17. The method according to claim 15, wherein said first format is a sequential digital format.

18. A wire hopper for converting a signal in a telecommunications system, said wire hopper comprising:
    a first interface for receiving said signal in a sequential digital format; and spread spectrum means for converting said signal from said sequential digital format into a spread spectrum format and for spreading said signal across a plurality of lines connected thereto, whereby said spread spectrum means forwards said spread spectrum format signal across said plurality of lines to a central office.

* * * * *